United States Patent [19]

Volgstadt et al.

[11] 4,282,175

[45] Aug. 4, 1981

[54] STAB-TYPE COUPLING AND METHOD

[75] Inventors: Frank R. Volgstadt, Madison; David P. Passerell, Geneva, both of Ohio

[73] Assignee: Perfection Corporation, Madison, Ohio

[21] Appl. No.: 83,861

[22] Filed: Oct. 11, 1979

Related U.S. Application Data

[63] Continuation of Ser. No. 899,813, Apr. 25, 1978.

[51] Int. Cl.$^3$ .............................................. B29C 19/00
[52] U.S. Cl. ................................. 264/248; 29/157 R; 29/428; 264/274; 285/104; 285/105
[58] Field of Search .................... 264/248, 274, 249; 29/157 R, 428; 285/104, 105, 243, 340; 156/96, 158, 159, 304

[56] References Cited

U.S. PATENT DOCUMENTS

| 2,961,363 | 11/1960 | Lowes | 156/294 |
| 3,276,941 | 10/1966 | Burns | 264/248 |
| 3,924,877 | 12/1975 | Leopold et al. | 285/340 |
| 4,107,452 | 8/1978 | Razvi | 285/323 |

FOREIGN PATENT DOCUMENTS 423668  4/1974  U.S.S.R. .................................. 156/158

Primary Examiner—Donald E. Czaja
Assistant Examiner—W. Thompson
Attorney, Agent, or Firm—Fay & Sharpe

[57] ABSTRACT

A stab-type coupling and method for connecting an end portion of a smooth wall non-metallic pipe to fittings or other pipes. The coupling is defined by a non-metallic coupling body, a generally elongated hollow insert, annular spacer rings, seal rings, a collet ring, and a retaining collet all disposed within the recess of the coupling body. The retaining collet is provided with a tapered external surface which is complementary to an internal frusto-conical surface defined by a back-up ring molded within the coupling body. The coupling is made up as by inserting the end of a smooth wall non-metallic pipe into the coupling body such that the pipe is received about the generally elongated hollow insert and within the retaining collet. The toothed internal surface of the retaining collet is adapted to engage the non-metallic pipe. Attempted withdrawal of the pipe from the coupling body is resisted by the collet toothed surface as well as the bearing engagement of the collet with the back-up ring molded into the coupling body.

2 Claims, 7 Drawing Figures

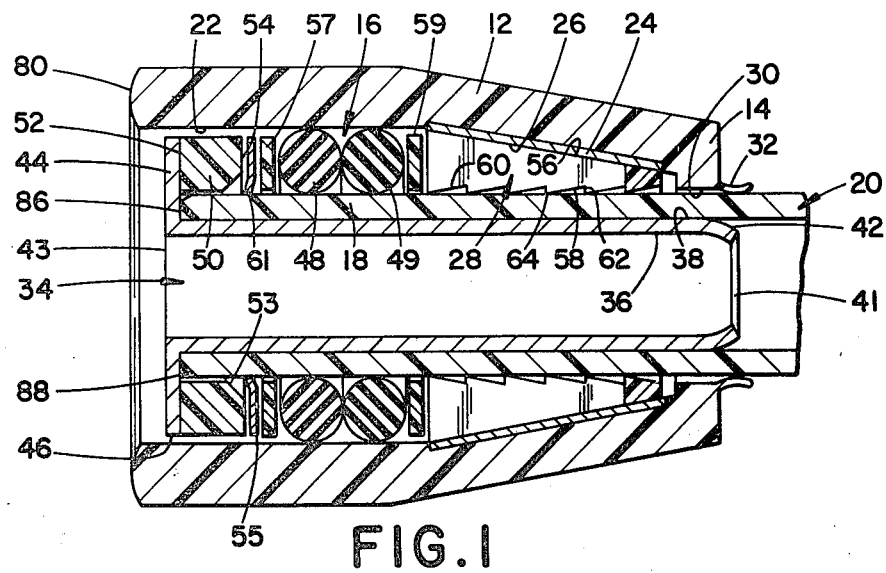
FIG. 1
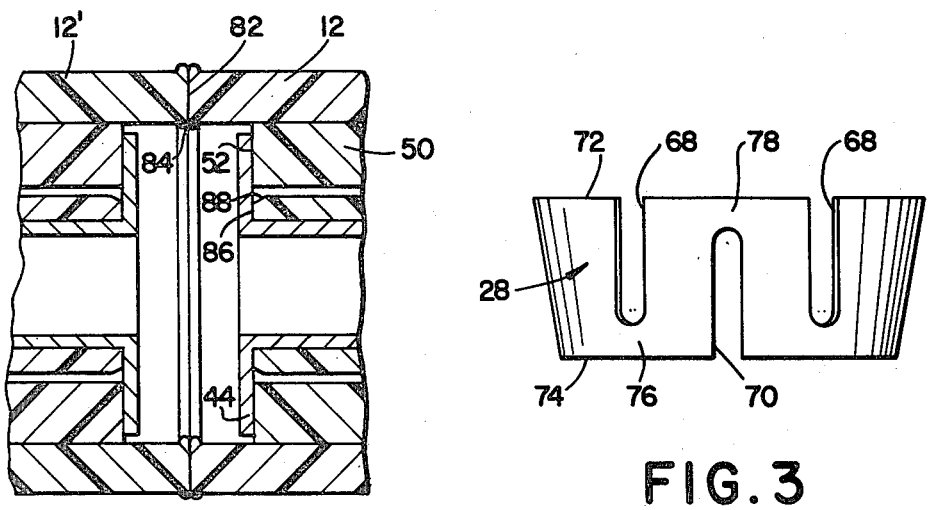
FIG. 2
FIG. 3
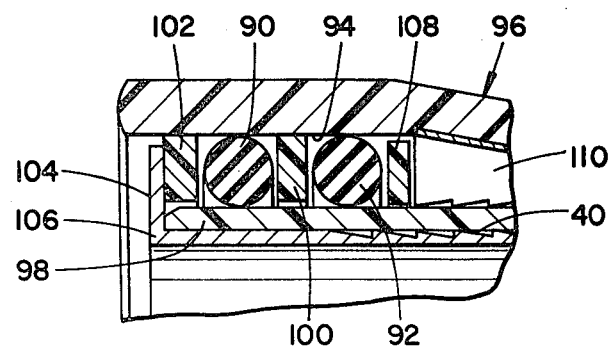
FIG. 4

STAB-TYPE COUPLING AND METHOD

This is a continuation of application Ser. No. 899,813, filed Apr. 25, 1978.

BACKGROUND OF THE INVENTION

This invention relates to stab-type couplings or couplings in which assembly of a smooth wall tube to a coupling body is accomplished by pushing or thrusting the tube into the coupling body. Gripping of the tube surface and the resistance to attempted withdrawal is based on the "Chinese finger" principle. A segmented retaining collet cooperates with the tube such that the greater the pull-out force the more securely the tube becomes seated within the coupling.

Stab-type couplings have been known to the prior art for a considerable period of time. Such couplings are relatively easy to use in installation and require merely severing the end of the tube at right angles and chamfering of the tube end to facilitate insertion of the tube into the coupling body. As an example, prior art stab-type couplings have used both solid and split-type gripper rings, solid or split-type gripper washers and various spring-type elements.

One problem encountered by stab-type couplings in the prior art is the complexity of design which requires special machining of parts resulting in increased costs. A further problem encountered in the prior art has been the relatively complicated assembly procedure that must be practiced with certain designs.

With the foregoing in mind, it is an object of the present invention to provide a stab-type coupling which provides a simple reliable connection for on site installation of new pipe and tubing or repair of damaged pipe and tubing without the need for cathodic protection.

BRIEF SUMMARY OF THE INVENTION

Briefly summarized, this invention provides for an improvement in stab-type couplings which is utilized for interconnecting the end portion of a smooth wall non-metallic pipe to a fitting or another pipe. The coupling is defined by a non-metallic coupling body having a first end and an internal recess adapted to receive the end portion of a smooth wall non-metallic pipe. The first end is provided with a moisture seal lip adapted to surround the pipe in a slight interference fit when the pipe is inserted into the body. A generally elongated hollow metallic insert is disposed within the recess of the coupling body. The smooth wall non-metallic pipe is adapted to be pushed over the insert as the pipe is installed in the coupling body. One or more seal rings are disposed within the recess and are adapted to sealingly engage the pipe and the coupling body to provide sealing within the coupling body. A retaining collet is disposed within the recess and is provided with a tapered external surface which converges in the direction of the first end of the coupling body. The collet is provided with a toothed internal surface adapted to engage the smooth wall non-metallic pipe. A generally frusto-conical back-up ring is molded into and retained by the coupling body and is provided with an internal surface generally complementary to an external surface of the collet. The relationship of the collet to the back-up ring is such that the collet is adapted to bear against the back-up ring in the event of an attempted withdrawal of the smooth wall non-metallic pipe from the coupling body.

A double ended stab-type coupling is provided for interconnecting a first non-metallic tube or pipe to a second non-metallic tube or pipe. The double ended coupling is defined by a pair of non-metallic coupling bodies which are butt fused together to define a single fluid tight coupling body into which a pair of smooth wall non-metallic pipes may be inserted.

The invention also contemplates a method of assembly of a double ended stab-type coupling.

BRIEF DESCRIPTION OF THE DRAWINGS

A more complete description of the invention will now be made with reference to the accompanying drawings in which:

FIG. 1 is an elevational cross-sectional view of the preferred embodiment of the coupling of this invention showing the interconnection of a tube to a coupling body;

FIG. 2 is an elevational cross-sectional view of the coupling of this invention as provided in a double ended coupling body embodiment;

FIG. 3 is an elevational view of the retaining collet of the coupling of this invention;

FIG. 4 is an elevational cross-sectional view of a modification of the sealing structure of the invention;

DESCRIPTION OF THE PREFERRED EMBODIMENT

Figure 5:
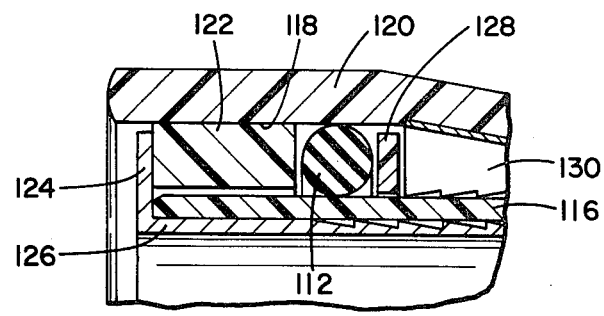
FIG. 5 is an elevational cross-sectional view of a further modification of the sealing structure of the invention.

Reference will first be made to FIG. 1 wherein there is shown the preferred embodiment of the stab coupling of this invention. The structure of FIG. 1 shows the mode of connection of a smooth wall plastic tube to a coupling body. It should be appreciated that the coupling body may take several different forms and that the structure of FIG. 1 depicts only that portion of the coupling body which cooperates with the tube for purposes of forming an interconnection or joint therewith.

The coupling of FIG. 1 includes a non-metallic coupling body 12 having a first end 14 and an internal recess 16 which is adapted to receive the end portion 18 of a smooth wall non-metallic tube or pipe 20.

In the embodiment of FIG. 1 coupling body 12 defines an internal generally cylindrical surface 22. A generally frusto-conical metallic back-up ring 24 is molded into coupling body 12 and defines an internal generally frusto-conical surface 26 which is adapted to cooperate with retaining collet 28 in a manner to be described more fully below.

Near the first end 14 of coupling body 12 there is defined a generally cylindrical internal surface 30 which is adapted to closely surround the external surface of tube 20 when inserted into the coupling body.

Molded integrally with coupling body 12 in the preferred embodiment of FIG. 1 is a generally outwardly extending flexible flange 32 which serves to define a dirt and moisture cover to retard or prohibit altogether the entry of dirt and moisture into the interior of the coupling body 12. It should be appreciated that the relationship between cover 32 and tube 20 is such that the cover sealingly engages the external surface of tube 20 through a slight interference fit as it is inserted into the coupling body 12.

In the preferred embodiment of FIG. 1 coupling body 12 is injection molded from polyethylene or other suitable plastic. Back-up ring 24 is fabricated from type 316 stainless steel and is insert molded into body 12.

Disposed within the recess of body 12 and approximately concentric with the axis thereof is a steel reinforcing stiffener or hollow insert 34. A generally cylindrical internal passageway 36 is defined within stiffener 34 for the purpose of permitting the passage of fluid therethrough. The external surface 38 of stiffener 34 is received within the interior of end portion 18 of tube 20. External surface 38 may either be in close sealing engagement with the internal surface of tube 20 or, alternately, may be loosely received therein if desired. While in the preferred embodiment the external surface 38 of insert 34 is generally smooth, it may be provided with a plurality of teeth 40 (FIG. 4). The purpose and function of teeth 40 is to provide for firm retention of the stiffener 34 within the tube 20.

At the first end 41 of stiffener 34 there is provided a chamfer 42 in order to facilitate the entry of the stiffener 34 into tube 20 as the tube 20 is thrust into the coupling body. At the second end 43 of stiffener 34 there is provided a generally radial outwardly extending flange 44. The dimension of the outer surface 46 of flange 44 is such that the flange is closely received within the cylindrical surface 22 of coupling body 12. That is to say, there is a slight clearance provided between the outer surface 46 of flange 44 and surface 22. Surface 22 thus cooperates with flange 44 in order to center, align and maintain stiffener 34 within coupling body 12 in a position approximately concentric with the axis of the coupling body 12. This relationship of the coupling body to flange 44 as just described is particularly helpful during assembly of the coupling as will be described below.

Sealing between the tube 20 and the coupling body 12 is provided by means of "O" ring seal 48, 49. As will be observed in FIG. 1 seals 48, 49 are positioned along the interior cylindrical surface 22 of the coupling body 12. The relationship of "O" ring seals 48, 49 to tube 20 and coupling body 12 is such that when the tube is inserted into the coupling body there is caused to be achieved a slight compression of the "O" ring seals 48, 49 with the result that sealing is achieved at the external surface of tube 20 and at the interior cylindrical surface 22 of the coupling body 12.

A generally annular spacer ring 50 is disposed essentially concentric with the axis of coupling body 12 adjacent flange 44. In the preferred embodiment of FIG. 1 spacer ring 50 is defined by a chamfer 53 and is fabricated from polyethylene material. The spacer 50 is structured to be loosely received about the external surface of tube 20. Spacer ring 50 functions to both position "O" ring seals 48, 49 in the manner shown in FIG. 1 and to provide support for flange 44 of stiffener 34 prior to the entry of tube 20 into the coupling body. As will be observed in FIG. 1 spacer ring 50 is defined by essentially planar side surfaces 52, 54. Side surface 52 cooperates with flange 44. Surface 54 is adjacent retaining ring 55.

Positioned on either side of "O" ring seals 48, 49 are thrust washers 57, 59. These washers function to position "O" ring seals 48, 49 and to separate the seals from the retaining collet 28 and the retaining ring 55. Washer 59 prevents movement of seal 49 into the recesses of the collet as well as any movement of the seal into the area of the frusto-conical surface 26. Seal 49 is thus captured or fixed in the position shown in FIG. 1 so as to be in contact with surface 22. Similarly washer 57 prevents movement of seal 48 into the retaining ring 55.

Retaining ring 55 is defined by a plurality of teeth 61 which are inclined in the direction of flange 44. Teeth 61 are dimensioned so as to provide an interference fit with tube 20 when inserted through ring 55. The purpose of the ring 55 is to retain the seals 48, 49, thrust washers 57, 59 and collet 28 in place about tube 20 in the position shown in FIG. 1. Attempted withdrawal of the tube from the coupling causes the seals, washers and collet to move as a unit to the right of FIG. 1 thus enhancing and supplementing the gripping of tube 20 by the collet and ring 55 as will be described below.

Positioned between washer 59 and first end 14 of the coupling body is retaining collet 28. As best seen in FIGS. 1 and 3 collet 28 is provided with a tapered external surface 56 which converges in the direction of the first end 14 of the coupling body 12. Tapered surface 56 is generally complementary to frusto-conical surface 26 defined by back-up ring 24 and is adapted to bear against surface 26 during such time as a pull-out force is exerted on tube 20. The interior of collet 28 is defined by a toothed surface generally designated 58. As will be evident from an inspection of FIG. 1 toothed surface 58 is defined by a plurality of inclined ramp surfaces 60 which diverge in the direction of the first end 14 of the coupling body 12. Ramp surfaces 60 are periodically interrupted by radial surfaces 62 which cooperate with ramp surfaces 60 to define edges 64 which provide for biting engagement into the external surface of tube 20. The orientation of the plurality of edges 64 and teeth 61, as viewed in FIG. 1, is away from first end 14 of coupling body 12. As a result an attempted withdrawal of tube 20 from coupling body 12 as by moving tube 20 to the right of FIG. 1 will cause the respective edges 64 and teeth 61 to bite into the external surface of tube 20.

While in the preferred embodiment as shown in FIG. 1 surfaces 62 are essentially radially oriented relative to the axis of the coupling body 12 it should be appreciated that in alternate embodiments surfaces 62 may be inclined relative to the axis of coupling body 12.

As will be observed in FIG. 3 collet 28 is provided with a plurality of generally longitudinally extending recesses 68, 70. The recesses are staggered such that alternate recesses 68 will open toward the second end 72 of collet 28 while corresponding alternate recesses 70 open toward first end 74. As will be observed from FIG. 1 the respective recesses 68, 70 extend through the entire radial thickness of the collet 28. The recesses do not extend through the entire collet in a longitudinal direction, however, since there are provided uninterrupted areas 76, 78 at the respective ends of the recesses 68, 70 as will be observed in FIG. 3.

The purpose and function of the recesses 68, 70 of collet 28 is to permit contraction of the collet at such time as a pull-out force is exerted on tube 20 and the collet is brought into abutting engagement with back-up ring 24 of the coupling body 12. As will be appreciated from a study of FIG. 1 the application of a pull-out force to tube 20 causes collet 28 to be cammed into back-up ring 24. As a result the collet is caused to be uniformly contracted circumferentially. Recesses 68, 70 provide an advantageous structure for absorbing contractions of the collet without cracking or distortion of the collet material.

Similarly, the alternately spaced longitudinal recesses 68, 70 permit the collet to expand radially outwardly. In the preferred embodiment the collet is manufactured such that the internal dimension of the toothed surface 58 is slightly less than the outer diameter of the tube. As a result there is established an initial interference fit between the tube and the collet whereby the collet is expanded slightly outwardly as the tube is inserted into the coupling body. As a consequence of preloading the collet there is achieved greater initial holding of the collet relative to the tube.

In the preferred embodiment retaining collet 26 is molded from an acetal copolymer. Other materials such as brass, stainless steel, plastics and non-corrosive metallic materials should be considered within the spirit of this invention. Similarly the use of reinforced plastics may be desirable.

As will be appreciated from a discussion of the invention thus far all of the elements of the coupling with the exception of the back-up ring 24 and stiffener 34 are fabricated from non-metallic materials. In the preferred embodiment the back-up ring is fabricated from stainless steel which renders it essentially impervious to corrosion. Stiffener 34 may be fabricated from steel or stainless steel. As a consequence the coupling of this invention is non-corrosive in nature and is suitable for use with plastic pipe. It should be appreciated, however, that alternate materials for the several components of the coupling may be selected including metals and other plastics. Similarly while the preferred embodiment of the invention has been described in connection with plastic tube or pipe it should be appreciated that metallic tubes or pipes may be used as well.

Thus far the invention as embodied in FIG. 1 has been described with reference to a coupling body 12 having a first end 14. There has been no description of the characteristics of the second end of the coupling body which is generally designated 80 in FIG. 1. It should be understood in this regard that the coupling body may take alternate forms insofar as the configuration of the second end. For example, the second end 80 could be provided with external male threads defining a male connector end. Second end 80 could be provided with female threads rendering the coupling suitable for use as a female connector. Alternately the coupling could be used as a reducing fitting, an L fitting, a T fitting, a transition fitting or other type of fitting known to the industry. Alternate connecting means could be employed at the second end 80 of the coupling body including fusion welding connecting means, ferrule-type connecting means or other connecting means well known to those skilled in the art.

FIG. 2 illustrates a double ended modification of applicant's invention wherein a pair of coupling structures of the type shown in FIG. 1 are caused to be joined in a "back-to-back" relationship for purposes of making a pipe-to-pipe or tube-to-tube connection. For ease of description many of the components of the coupling of this invention have been omitted from FIG. 2 since the principal attention of FIG. 2 is the relationship of duplicate coupling segments which have been joined together.

In FIG. 2 coupling body 12 is shown joined to a similar coupling body 12' by means of a butt heat fused joint 82. Joint 82 is formed by first causing to be heated opposed planar surfaces of the respective coupling bodies 12, 12'. Once heated to appropriate fusing temperature the coupling bodies are caused to be drawn together under pressure resulting in the formation of a fused joint 82. When the joint is cooled there is defined a raised shoulder 84 extending circumferentially about both the interior and exterior of the coupling bodies 12, 12'.

Prior to fusing of the respective coupling bodies 12, 12' of FIG. 2 together each of the respective coupling bodies are caused to be assembled as follows. The retaining collet 28 is first caused to be inserted into the coupling body 12 by passing the collet through the second end thereof. Thereafter the thrust washer 59 and "O" ring seals 48, 49 are passed through the second end of the coupling body into position just behind the collet. The thrust washer 57, ring 55 and spacer 50 are then positioned adjacent the "O" ring seal 48 followed by placement of the reinforcing stiffener 34. With the elements assembled in each of the respective coupling bodies 12, 12', the bodies are fused together in the manner described above. Once the coupling bodies are joined together the several components of the coupling are positioned within the coupling body in a manner to receive the respective end portions of tubes or pipes. Each tube is caused to be joined to the coupling by thrusting or inserting the free end of the tube into the coupling body in a manner such that the stiffener 34 is received within the tube while, at the same time, the tube is caused to be passed within the collet 28, retaining ring 55, thrust washers 57, 59, "O" ring seals 48, 49 and spacer ring 50. In installation the tube is inserted completely into the coupling body until the free end 86 thereof is caused to bottom against flange 44.

Prior to insertion of the tube into the coupling body a right angle cut is made in the tube in order to define a free end 86 (FIG. 1) which is essentially radial in orientation relative to the axis of the tube. For ease of installation the tube is then chamfered at 88 in order to facilitate the insertion of the tube through the collet, the thrust washers, retaining ring, seal rings and the spacer. Chamfering may be accomplished using any conventional bevel tool. At the time the tube is chamfered provision may be made for causing a mark to be placed at the exterior surface of the tube in order to insure that the tube is inserted into the coupling to a proper depth when the coupling is made up.

It should be appreciated that with the exception of the insertion of the free end of the tube into the coupling body all assembly operations concerning the coupling are carried out in the coupling manufacturer's plant. That is to say, the coupling body, collet, thrust washers, retaining ring, seal rings, spacer ring and stiffener are initially assembled in the manner shown in FIG. 1 in the manufacturer's plant and shipped as a self-contained unit ready to receive the free end of a tube or pipe in the field. When received in the field, therefore, the coupling unit requires no further assembly other than to cut and chamfer a section of pipe or tubing to be joined and, thereafter, insert the pipe or tubing into the coupling. There is no fusion joint made in the field nor is there any necessity to assemble the components in the field. This eliminates concern of incorrect assembly oftentimes raised in connection with prior art structures wherein the installer must assemble all the components of the coupling in the field under conditions less than optimum.

Whether the coupling body 12 takes the form of a male connector, female connector, double ended embodiment as shown in FIG. 2 or any alternate embodiment, the coupling body is self-contained and ready to receive the free end of a section of pipe or tube when shipped to the job site.

As has previously been noted, the radial dimension of flange 44 is such that the flange is closely received within cylindrical surface 22 of coupling body 12. As a consequence the stiffener 34 is caused to be captured within the coupling body in a position approximately concentric with the axis thereof so that there is defined a generally annular recess between the stiffener and the collet, thrust washers, retaining ring, seal rings and spacer ring elements. Such recess is, of course, for the purpose of receiving the free end of a length of pipe or tube.

In FIG. 2 it should be observed that the raised shoulder 84 defines, at the interior of the coupling bodies 12, 12′ a back-up surface which cooperates with surface 52 of spacer ring 50 in order to trap flange 44 therebetween. Depending on the dimensional relationship of the several elements of the coupling it may be considered desirable to provide for more or less space between flange 44 and raised shoulder 84 of butt joint 82 than that shown in FIG. 2. Alternate spacing relationships should be considered within the scope and spirit of this invention. Shoulder 84 also functions to inhibit interference of one side of the double ended coupling with the other. That is to say, shoulder 84 inhibits movement of flange 44 to the left (or right as the case may be) so as not to interfere with the opposed flange.

In the preferred embodiment the coupling body 12 is provided with an insert molded stainless steel back-up ring 24 which defines a rigid camming surface into which the collet 28 is caused to bear in the event of the application of a pull-out force to the tube 20. Alternate embodiments should be considered within the scope and spirit of this invention including structure wherein the stainless steel back-up ring 24 is eliminated entirely from the coupling body and, in place thereof, a frusto-conical surface 26 is defined by the coupling body itself.

A first modification of the seal structure of the invention is shown in FIG. 4. A pair of O-rings 90, 92 sealingly engage the external surface of tube 98 and the internal surface 94 of the coupling body 96. Spacer 100 is positioned between O-rings 90, 92. Spacer 102 is positioned between O-ring 90 and flange 104 of insert 106. Shim spacer ring 108 is positioned between collet 110 and O-ring 92.

A second modification of the seal structure of the invention is shown in FIG. 5. A single O-ring 112 sealingly engages the external surface of tube 116 and the internal surface 118 of the coupling body 120. Spacer 122 is positioned between O-ring seal 112 and flange 124 of insert 126. Shim spacer ring 128 is positioned between collet 130 and O-ring 112. In the modification of FIG. 5 the O-ring seal 112 makes sealing contact with the external surface of tube 116 and surface 118 of body 120.

Figure 6:
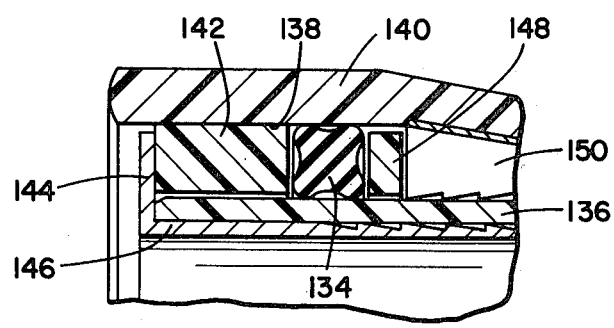
FIG. 6 is an elevational cross-sectional view of a still further modification of the sealing structure of the invention.

A third modification of the seal structure of the invention is shown in FIG. 6. An "H" type seal 134 sealingly engages the external surface of tube 136 at two spaced apart locations thereon. Similarly seal 134 sealingly engages surface 138 of coupling body 140 at two spaced apart locations thereon. Spacer 142 is positioned between seal 134 and flange 144 of insert 146. Shim spacer 148 is positioned between collet 150 and seal 134.

Figure 7:
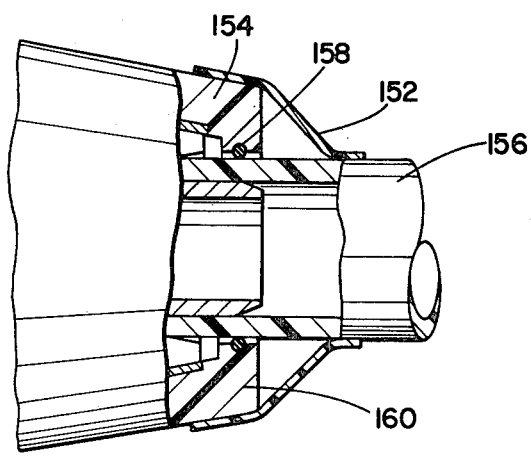
FIG. 7 is an elevational cross-sectional view of a modification of the dirt and moisture cover of the invention.

A modification of the dirt and moisture cover of the invention is shown in FIG. 7. An elastomeric or plastic sleeve 152 is secured to the coupling body 154 and sealingly engages the external surface of tube 156. Sleeve 152 may be dip molded to the coupling body 154 and extended into place as shown in FIG. 7 after insertion of tube 154 into the coupling body. In addition an O-ring seal 158 is shown disposed in flange 160 of body 154. O-ring seal 158 sealingly engages tube 156 at the external surface thereof.

The method of this invention for the assembly of a double ended stab-type coupling for connecting a first smooth wall non-metallic pipe to a second smooth wall nonmetallic pipe comprises the steps of:

(a) providing a first non-metallic coupling body having a first end and a second end and an internal recess adapted to receive the end portion of the first smooth wall non-metallic pipe, said internal recess defining a generally frusto-conical surface;

(b) providing a second non-metallic coupling body having a first end and a second end and an internal recess adapted to receive the end portion of the second smooth wall non-metallic pipe, said internal recess defining a generally frusto-conical surface;

(c) providing a first and second elongated hollow insert, each of said inserts having a radial flange extending outwardly therefrom;

(d) providing a first and second seal ring;

(e) providing a first and second retaining collet, each of said collets having a tapered external surface which converges toward one end thereof and a toothed internal surface;

(f) providing a first and second generally annular spacer ring;

(g) providing at least one first and second generally annular thrust washer;

(h) inserting a respective retaining collet, thrust washer, seal ring, spacer ring, and hollow insert into a respective coupling body such that the internal surface of each respective coupling body is generally complementary to the external surface of each respective retaining collet and the radial flange of each respective hollow insert is generally disposed adjacent the second end of each respective coupling body;

(i) fusing the respective coupling bodies together at the second ends thereof.

ADVANTAGES OF THE INVENTION

Applicant's improved coupling and method provide numerous advantages. Applicant's containment mechanism provides that the plastic tubing is fully contained and retained between metallic members which cooperate with or are contained within the non-metallic coupling body.

In the design of non-metallic tube fittings the creep phenomenon of certain plastics can cause a loss of the gripping and sealing function of various elements of the fitting. Applicant, on the other hand, has provided in the fitting and method of this invention that the plastic tubing be contained between metallic members which are not subject to creep. Referring to FIG. 1 it can be appreciated that end portion 18 of tube 20 is trapped between the metallic stiffener 34 and the back-up ring 24. As a consequence the back-up ring and stiffener define a constant dimension which receives the plastic tubing there being no variation in the dimension as a consequence of creep.

A further advantage of applicant's invention resides in the fact that the steel reinforcing stiffener is designed as an integral part of the coupling as initially assembled at the manufacturer's plant. The built-in feature of the stiffener eliminates the necessity of requiring the installer in the field to place the stiffener in the tube end before insertion of the tube into the coupling body. In many cases it has been found that the installer will neglect to install the stiffener in the field. Unfortunately, the absence of a stiffener is not capable of being checked by quality control personnel since, once assembled, the stiffener is no longer in view. Accordingly, in providing for a built-in stiffener applicant has eliminated the possibility of an installer inadvertently failing to insert a stiffener at the time of installation.

A further advantage of applicant's stiffener is that it reinforces the tube end against collapse as a result of loading imparted to the tube during pull out.

In addition to defining a stable interior dimension applicant's stainless steel back-up ring 24 provides increased rigidity against pull out of the collet and tube from the coupling body.

Testing of applicant's coupling has shown that the strength of the fitting significantly exceeds that of the polyethylene or polybutylene pipe or tube used with the fitting. That is to say, in pull-out tests conducted with respect to applicant's device the pipe or tube will fail in tension without pull out being observed from the coupling body.

Applicant's coupling assures quick, reliable on site repairs and installation of pipe and tubing in the field. The "Chinese finger" stab principle provides for increased resistance to pull out forces as a function of increased magnitude of such forces. As the magnitude of the pull out force on the tube increases the collet exerts a greater gripping force on the surface of the tube causing tube and collet to become more seated within the coupling.

What is claimed is:

1. A method of assembly of a double ended stab-type coupling for connecting a first smooth wall non-metallic pipe to a second smooth wall non-metallic pipe, said method comprising the steps of:
   (a) providing a first non-metallic coupling body having a first end and a second end and an internal recess adapted to receive the end portion of the first smooth wall non-metallic pipe, said internal recess defining a generally frusto-conical surface;
   (b) providing a second non-metallic coupling body having a first end and a second end and an internal recess adapted to receive the end portion of the second smooth wall non-metallic pipe, said internal recess defining a generally frusto-conical surface;
   (c) providing a first and second elongated hollow insert, each of said inserts having a radial flange extending outwardly therefrom;
   (d) providing a first and second seal ring;
   (e) providing a first and second retaining collet, each of said collets having a tapered external surface which converges toward one end thereof and a toothed internal surface;
   (f) providing a first and second generally annular spacer ring;
   (g) inserting a respective retaining collet, seal ring, spacer ring, and hollow insert into a respective coupling body such that the internal surface of each respective coupling body is generally complementary to the external surface of each respective retaining collet and the radial flange of each respective hollow insert is generally disposed adjacent the second end of each respective coupling body;
   (h) fusing the respective coupling bodies together at the second ends thereof.

2. A method of assembly of a double ended stab-type coupling for connecting a first smooth wall non-metallic pipe to a second smooth wall non-metallic pipe, said method comprising the steps of:
   (a) providing a first non-metallic coupling body having a first end and a second end and an internal recess adapted to receive the end portion of the first smooth wall non-metallic pipe;
   (b) providing a second non-metallic coupling body having a first end and a second end and an internal recess adapted to receive the end portion of the second smooth wall non-metallic pipe;
   (c) providing hollow insert means;
   (d) providing a first and second seal ring;
   (e) providing a first and second retaining ring, each of said retaining rings having locking teeth;
   (f) providing a first and second generally annular spacer ring;
   (g) inserting a respective seal ring, retaining ring, and spacer ring into a respective coupling body;
   (h) inserting said hollow insert means into said coupling bodies;
   (i) fusing the respective coupling bodies together at the second ends thereof.

* * * * *